(12) United States Patent
Lindell

(10) Patent No.: US 10,196,266 B2
(45) Date of Patent: Feb. 5, 2019

(54) PROCESS FOR PRODUCING HYDROGEN

(71) Applicant: Haldor Topsøe A/S, Kgs. Lyngby (DK)

(72) Inventor: Kristian Lindell, Kävlinge (SE)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/323,157

(22) PCT Filed: Jul. 8, 2015

(86) PCT No.: PCT/DK2015/050206
§ 371 (c)(1),
(2) Date: Dec. 30, 2016

(87) PCT Pub. No.: WO2016/004955
PCT Pub. Date: Jan. 14, 2016

(65) Prior Publication Data
US 2017/0137286 A1 May 18, 2017

(30) Foreign Application Priority Data

Jul. 9, 2014 (DK) .................................. 2014 00374

(51) Int. Cl.
*C01B 3/34* (2006.01)
*C01B 3/48* (2006.01)
(Continued)

(52) U.S. Cl.
CPC ................ *C01B 3/48* (2013.01); *C01B 3/382* (2013.01); *C01B 3/56* (2013.01); *C10G 2/30* (2013.01);
(Continued)

(58) Field of Classification Search
CPC .... B01J 2208/00132; B01J 2208/00504; B01J 2208/00212; B01J 8/00; B01J 8/0453; B01J 8/0492; B01J 2208/0053; B01J 2208/00849; B01J 8/0469; B01J 8/067; B01J 2208/025; B01J 2208/00309; B01J 8/048; B01J 8/0465; B01J 8/065; C01B 3/386; C01B 2203/142; C01B 2203/043; C01B 3/382; C01B 2203/0233; C01B 2203/0261; C01B 2203/0415; C01B 3/384; C01B 2203/046; C01B 3/48; C01B 2203/0283; C01B 2203/042; C01B 2203/0283; C01B 2203/84; C01B 2203/0811;
(Continued)

(56) References Cited

U.S. PATENT DOCUMENTS 5,844,005 A * 12/1998 Bauman .................. C07C 1/045
518/700
7,300,642 B1 11/2007 Pedersen et al.
(Continued)

FOREIGN PATENT DOCUMENTS

EP 0 737 647 A2 10/1996
EP 0 742 172 A2 11/1996
(Continued)

*Primary Examiner* — Amber R Orlando
*Assistant Examiner* — Syed T Iqbal
(74) *Attorney, Agent, or Firm* — Blank Rome LLP

(57) ABSTRACT

Process for producing hydrogen in which tail gas from a separate plant for production of gasoline or diesel is added downstream the steam methane reforming stage and upstream the water gas shift stage of a hydrogen production plant.

9 Claims, 1 Drawing Sheet

(51) Int. Cl.
  *C01B 3/38* (2006.01)
  *C01B 3/56* (2006.01)
  *C10G 2/00* (2006.01)

(52) U.S. Cl.
  CPC ............ *C01B 2203/0233* (2013.01); *C01B 2203/0283* (2013.01); *C01B 2203/042* (2013.01); *C01B 2203/043* (2013.01); *C01B 2203/062* (2013.01); *C01B 2203/1058* (2013.01); *C01B 2203/1082* (2013.01); *C01B 2203/127* (2013.01); *C01B 2203/1241* (2013.01); *C01B 2203/1247* (2013.01); *C01B 2203/142* (2013.01)

(58) Field of Classification Search
  CPC .... C01B 2203/0405; C01B 2203/1229; C01B 3/56; C01B 3/52; C01B 3/503; C01B 2203/0288; C01B 2203/0244; C01B 2203/1241; C01B 2203/1247; C01B 2203/0888; C01B 2203/1288; C01B 2203/1223; C01B 2203/0883; Y02P 20/145
  See application file for complete search history.

(56) References Cited

U.S. PATENT DOCUMENTS

| | | |
|---|---|---|
| 2003/0134911 A1 | 7/2003 | Schanke et al. |
| 2006/0137246 A1 | 6/2006 | Kumar et al. |
| 2007/0000176 A1* | 1/2007 | Liu .............. B01J 8/0438 48/198.1 |
| 2007/0212271 A1* | 9/2007 | Kennedy .............. B01D 53/508 422/177 |
| 2008/0312347 A1 | 12/2008 | Ernst et al. |
| 2013/0065974 A1 | 3/2013 | Kresnyak |
| 2013/0082211 A1 | 4/2013 | Aasberg-Petersen et al. |
| 2013/0090393 A1 | 4/2013 | Bracht et al. |

FOREIGN PATENT DOCUMENTS

| | | |
|---|---|---|
| WO | WO 2005/005576 A1 | 1/2005 |
| WO | WO 2011/048066 A1 | 4/2011 |
| WO | WO 2012/158679 | 11/2012 |
| WO | WO 2013/033812 A1 | 3/2013 |
| WO | WO 2014/057013 A1 | 4/2014 |

\* cited by examiner

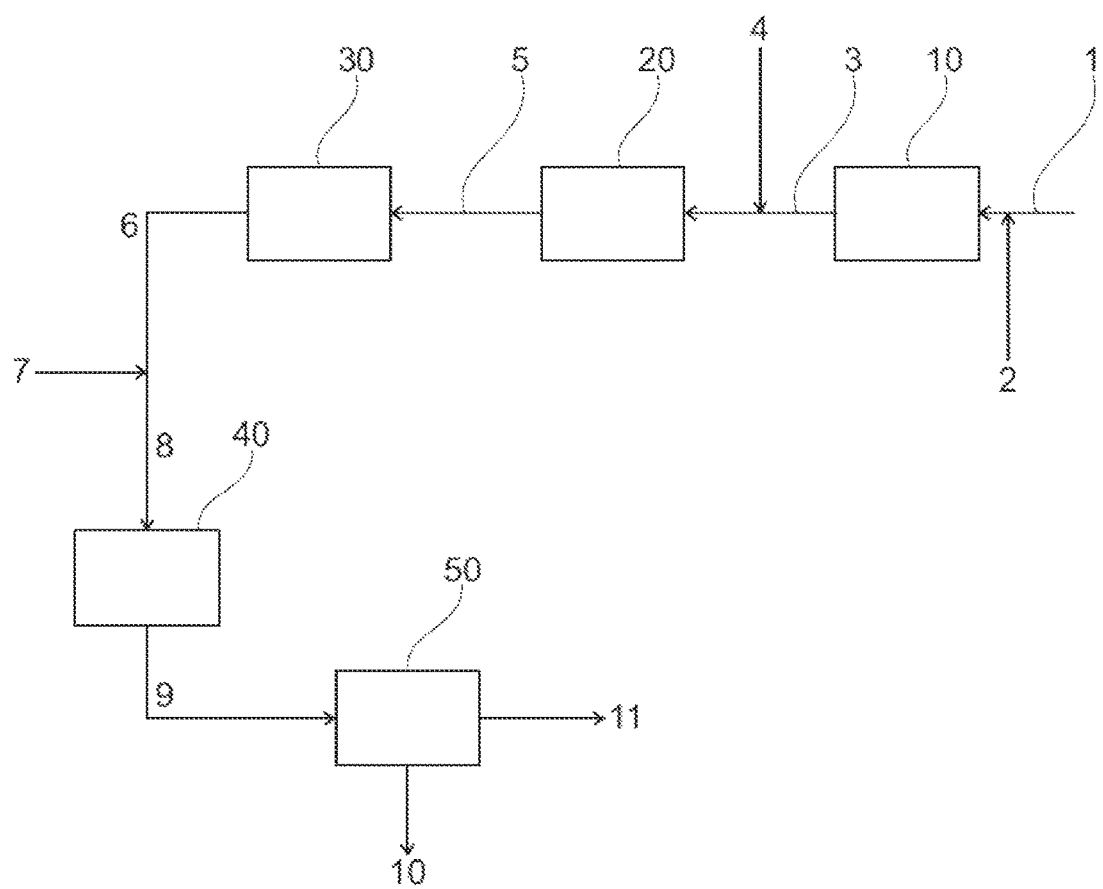

PROCESS FOR PRODUCING HYDROGEN

FIELD OF THE INVENTION

The present invention relates to a process for producing hydrogen from a hydrocarbon feedstock. The invention relates in particular to a process for the production of hydrogen in which part the hydrocarbon feedstock is reformed into a raw synthesis gas and the gas is mixed with recycled tail gas from a separate Fischer-Tropsch plant for diesel production or a separate plant for gasoline production. The resulting gas mixture is enriched in hydrogen trough a water gas shift process prior to final purification of hydrogen in a hydrogen separating unit.

The hydrogen product may be used as make-up hydrogen in the preparation of Fischer-Tropsch synthesis gas used as feed in such separate Fischer-Tropsch plant, and/or for upgrading of Fischer-Tropsch products in the product upgrading section of the Fischer-Tropsch plant.

BACKGROUND OF THE INVENTION

A plant for production of gasoline, liquid hydrocarbons such as diesel, or methanol from for example natural gas typically comprises of the following main process units: (a) air separation, (b) synthesis gas preparation via autothermal reforming (ATR), (c) the actual synthesis of e.g. diesel, (d) upgrading and/or separation. In the synthesis gas preparation section, hydrocarbon feedstock, normally natural gas is normally pre-reformed, and then passed through an autothermal reformer (ATR) to produce a synthesis gas. An oxygen containing stream is also added to the ATR. This synthesis gas is cooled, water is removed and the thus dehydrated synthesis gas is converted to a raw product. The raw product is then upgraded and/or separated from undesired by-products to provide the desired end product, such as diesel or gasoline.

Particularly, in a plant for production of diesel, Fischer-Tropsch (FT) synthesis is carried out for producing a mixture of hydrocarbons comprising for example wax and liquids as well as a range of lighter and gaseous hydrocarbons with hydrogen and carbon monoxide as reactants. In this case the upgrading section would normally comprise hydrocracking for production of the final product which is mainly diesel.

The FT synthesis often also produces an off-gas in the form of so-called tail gas comprising unreacted hydrogen and carbon monoxide and light hydrocarbons (typically with 5 or less carbon atoms) including olefins. The tail gas often also comprises carbon dioxide and other typically inert compounds such as nitrogen and argon. It is known to recycle tail gas to the ATR section to adjust the $H_2/CO$-molar ratio in the synthesis gas to the desired value for FT synthesis which typically is around 2.

The prior art is silent about adding tail gas to a specific point of a separate plant for independent production of hydrogen.

For instance, US-A-2003/0134911 discloses a process integrating Fischer-Trospch synthesis and syngas production in which Fischer-Tropsch tail gas from the upgrading section is treated sequentially by hydrogenation and steam reforming. The thus reformed tail gas is added either to the synthesis gas entering the Fischer-Tropsch synthesis reactor, or to the pre-reformed gas prior to the autothermal reformer in the synthesis gas section of the plant.

US-A-2008/0312347 discloses a process for producing hydrocarbons via Fischer-Tropsch synthesis. Fischer-Tropsch tail gas from product separation stage is shifted and then passed through a carbon dioxide removal stage, a dehydration stage and a cryogenic stage. A part of the hydrogen from the cryogenic stage is mixed with methane also exiting such cryogenic stage. Then, sulfur is removed from the gas mixture and finally passed through a reforming stage where synthesis gas for downstream Fischer-Tropsch synthesis is produced.

WO-A-2014/057013 discloses a process in which tail gas from Fischer-Tropsch synthesis is treated by hydrogenation, shift and methanation before subjecting the resulting gas to autothermal reforming. The gas from the autothermal reforming, which is partially shifted, is sent to the Fischer-Tropsch section where it is mixed with synthesis gas produced by gasification.

US-A-2013/0082211 discloses a process in which a dry hydrocarbon feedstock, preferably tail gas from Fischer-Tropsch synthesis, is treated by the sequential stages of hydrogenation, water gas shift and reforming. The thus resulting synthesis gas is combined with a gaseous feedstock derived from a carbonaceous feedstock and fed to a Fischer-Tropsch plant for production of hydrocarbons.

US-A-2013/0065947 discloses in its FIG. 4 a process for diesel production in which naphtha and Fischer-Tropsch tail gas are added together with natural gas to the a pre-treatment unit upstream the steam methane reformer.

The pre-treatment unit consists of a hydrotreater, desulfurization unit and pre-reformer unit.

US-A-2013/0090393 discloses a process in which tail gas from Fischer-Tropsch synthesis is treated by the sequential stages of water gas shift, carbon dioxide-removal and hydrogen separation in a PSA-unit (Pressure Swing Adsorption) to produce a hydrogen stream used to upgrade the heavy fraction of the Fischer-Tropsch synthesis.

SUMMARY OF THE INVENTION

It has been surprisingly found that by adding tail gas specifically to the raw synthesis gas downstream a steam methane reformer and upstream the water gas shift stage of a hydrogen producing plant (hydrogen producing section), significant benefits in terms of reduced plant complexity and associated investment costs are obtained.

The invention is thus a process for producing hydrogen from a hydrocarbon feedstock comprising passing the feedstock through the sequential stages of steam methane reforming, water gas shift, and hydrogen separation, in which at least a portion of the tail gas from a separate plant for production of gasoline or diesel (from synthesis gas) is added downstream the steam methane reforming stage and upstream the water gas shift stage.

Contrary to the prior art, which suggests either to recycle tail gas to the synthesis gas section of the Fischer-Tropsch plant (for production of diesel), or more specifically to recycle tail gas upstream the steam methane reformer particularly together with natural gas feed and naphtha recycle, or to directly shift the tail gas without prior steam reforming to recover a hydrogen stream, the present invention identifies a specific point of addition of the tail gas downstream the steam methane reforming yet upstream the shift stage in a separate plant for hydrogen production. As a result, significant advantages are obtained. Among other things, the invention enables a more inexpensive process, as a larger reforming section and larger catalyst volumes will be required if the tail gas is fed to for instance the steam methane reformer stage of the hydrogen plant. In other words, capital costs are significantly reduced.

In a particular embodiment in connection with the above or any of the below embodiments, the hydrocarbon feedstock is subjected to a pre-reforming stage prior to passing through the steam reforming stage.

In another particular embodiment in connection with any of the above or below embodiments, the hydrocarbon feedstock is subjected to hydrogenation and sulfur removal prior to passing through the pre-reforming stage. In the hydrogenation stage, part or all of the unsaturated hydrocarbons such as olefins are converted into paraffins according to the following reaction (given for olefins);

$$C_nH_{2n}+H_2 \leftrightarrow C_nH_{2n+2} \text{ (for } n>2) \quad (1)$$

The olefins are hydrogenated over a CoMo or NiMo hydrogenation catalyst. The hydrogenation of olefins reduces the potential for i.a. carbon laydown in downstream units, particularly the pre-reformer. Further, the hydrogenated stream is prepared for the subsequent desulfurization stage, i.e. hydrodesulfurization.

Sulfur traces in the gas are thereby removed over a catalyst bed comprising zinc oxide (sulfur absorber), thereby avoiding sulphur poisoning of the pre-reformer downstream as well as other downstream catalysts such as the Fischer-Tropsch synthesis catalyst.

The hydrocarbon feedstock after being desulfurized feedstock is subjected to pre-reforming, preferably adiabatic pre-reforming before being directed to the downstream steam reforming stage. In the adiabatic pre-reformer most or all of the higher hydrocarbons (hydrocarbon compounds with 2 or more carbon atoms) are converted according to the following reactions:

$$C_nH_m+nH_2O \rightarrow (\tfrac{1}{2}m+n)H_2+nCO \quad (2)$$

$$3H_2+CO \leftrightarrow CH_4+H_2O \quad (3)$$

$$CO+H_2O \leftrightarrow H_2+CO_2 \quad (4)$$

Reactions (3) and (4) are normally close to equilibrium at the outlet of the pre-reformer.

Preferably, the pre-reforming stage is conducted adiabatically in a fixed bed of nickel catalyst. Thus, the adiabatic pre-reformer contains preferably a fixed bed of catalyst having nickel as the active constituent on a suitable carrier, such as MgO/Al2O3 or Mg—Al spinel.

In yet another particular embodiment in connection with any of the above or below embodiments, the hydrocarbon feedstock is natural gas, naphtha, or combinations of both. Preferably, the hydrocarbon feedstock is a combination of natural gas and naphtha. More preferably naphtha is combined with natural gas before the hydrogenation stage.

In yet another particular embodiment in connection with any of the above or below embodiments, the steam reforming stage is conducted by conventional steam methane reforming where heat for reforming is provided by radiant heat transfer, i.e. via external burners mounted on the walls, top or bottom of a furnace, convection reforming, or combinations of both. Preferably, the steam reforming is conducted by convection reforming in which the reformer is of the conventional bayonet tube type with an inner tube coaxially arranged in an outer sheath tube. Steam reforming catalyst is loaded in an annular space defined between the walls of the inner tube and the outer tube. Necessary heat for the endothermic steam reforming reactions proceeding in the process gas is thereby provided by hot flue gas passing externally along the wall of the sheath tube. Such convection reforming may be conducted in one or more steam reformers, as for instance disclosed in U.S. Pat. No. 5,925,328 (application Ser. No. 08/943,066). Combinations of conventional steam methane reforming and convection reforming (e.g. heat exchange reforming) may also be used.

As used herein, the terms "steam methane reforming stage" or "stage of steam methane reforming", "steam reforming stage", "reforming stage" are used interchangeably.

More preferably, the steam reforming stage is conducted by combination of conventional steam methane reforming where heat for reforming is provided by radiant heat transfer and convection reforming, e.g. by the so-called TBR (The Topsoe Bayonet Reformer) which consists of bayonet reformer tubes in a furnace box heated by radiant wall burners.

In one particular embodiment in connection with any of the above or below embodiments, the water gas shift stage is high temperature water gas shift. Suitably, the water gas shift stage is a low temperature or medium temperature water gas shift. Optionally, the water gas shift stages may comprise a combination of low temperature water gas shift, medium temperature water gas shift and high temperature gas shift.

In another particular embodiment in connection with any of the above or below embodiments, the hydrogen separation stage is conducted via a PSA-unit (Pressure Swing Adsorption) unit. From this unit a hydrogen product stream is recovered for any required use.

In yet another particular embodiment in connection with any of the above embodiments, at least a portion of synthesis gas from said separate plant for production of gasoline or diesel, e.g. from synthesis gas (syngas) of a gasifier in such separate plant, is also added downstream the steam methane reforming stage and upstream the water gas shift stage. Such syngas may also be combined with the tail gas prior to entering the shift stage. We have found that additional benefits are obtained by also adding the synthesis gas from the separate plant to the shift stage of the hydrogen producing plant, i.e. downstream the reforming stage and upstream the shift stage, instead of the straightforward point which is the hydrogen separating unit, e.g. PSA to produce more hydrogen and control the H$_2$/CO molar ratio of the synthesis gas used for downstream Fischer-Tropsch or gasoline synthesis. More specifically, the advantage of sending the synthesis gas from the separate plant to shift prior to send it to the PSA unit is that also the carbon monoxide content of the synthesis gas is converted into hydrogen. This reduces the amount of hydrogen required from the reformer section, hence reducing investment costs as well as operating costs. Further, it can also improve the PSA hydrogen recovery efficiency, again reducing total plant investment cost, and finally it helps generating less low-pressure low-LHV (low-Low Heating Value) PSA off-gas which is highly undesirable.

Preferably, tail gas as used herein means an off-gas from a Fischer-Tropsch synthesis unit or from a gasoline synthesis unit comprising:
5-35 vol. % carbon monoxide (CO)
5-35 vol. % hydrogen (H$_2$)
5-35 vol. % carbon dioxide (CO$_2$) more than 2 vol. % methane (CH$_4$)

Such tail gas in many cases also comprises higher hydrocarbons including olefins, as well as argon and nitrogen. As used herein, tail gas does not encompass naphtha.

As described above, the tail gas may also come from gasoline synthesis. In gasoline synthesis oxygenates such as methanol and/or dimethyl ether (DME) are used as feed to a gasoline reactor. The methanol itself is produced catalytically using a methanol synthesis gas produced via steam reforming. DME is produced by dehydration of methanol. The gasoline reactor produces a product effluent which is cooled to provide separate effluents of water, a tail gas (unconverted gas) which is rich in $CO_2$, as well as a liquid hydrocarbon phase of mixed gasoline and a light-end fraction in the form of LPG, i.e. raw product stream of gasoline or simply raw gasoline. The raw gasoline may be further processed by conventional means to obtain a lower-boiling gasoline fraction and the light-end fraction as LPG.

In a particular embodiment the invention is also a process for producing hydrogen from a hydrocarbon feedstock comprising: passing the feedstock through the sequential stages of steam methane reforming, water gas shift, and hydrogen separation, in which at least a portion of synthesis gas from said separate plant for production of gasoline or diesel (from synthesis gas), is added downstream the steam methane reforming stage and upstream the water gas shift stage.

Accordingly, in this embodiment there is no need to add tail gas between the steam methane reforming stage and shift stage or to combine tail gas with the synthesis gas from said separate plant for production of gasoline or diesel prior to adding the combined stream in between the reforming stage and shift stage. Suitably, the synthesis gas is syngas from the gasifier of said separate plant.

BRIEF DESCRIPTION OF THE DRAWING

The accompanying FIGURE shows a specific embodiment of the invention comprising the addition of tail gas from a separate plant for production of diesel or gasoline to the steam reformed gas upstream the shift stage of a separate hydrogen production plant.

DETAILED DESCRIPTION

In the accompanying FIGURE a separate plant for hydrogen production is shown in block diagrams. Natural gas 1 is combined with a naphtha feed 2 to form a hydrocarbon feedstock which is passed through pre-treatment unit 10 comprising a hydrogenator and sulfur absorber (not shown). Steam 4 is added to the pre-treated hydrocarbon feedstock 3 which is then pre-reformed in pre-reformer unit 20. The pre-reformed gas 5 is then passed through steam reforming stage 30 to form a reformed gas 6. Tail gas 7 from a separate plant for production of diesel or gasoline is combined with the reformed gas 6 (raw synthesis gas) to form gas mixture 8 which is used as feed to the water gas shift (shift) stage 40. The resulting gas 9, which is enriched in hydrogen may then pass through a deareator, air cooler and water separator (not shown) before entering a PSA-unit 50, from which a PSA-off gas 10 is withdrawn as well as final hydrogen product 11.

The invention claimed is:

1. Process for producing hydrogen from a hydrocarbon feedstock comprising: passing a feedstock comprising at least one of natural gas and naphtha through sequential stages of steam methane reforming, water gas shift, and hydrogen separation, in which at least a portion of a tail gas from a separate plant for production of gasoline or diesel is combined into a reformed stream by adding the tail gas downstream the steam methane reforming stage and upstream the water gas shift stage, such that reformed gas including the added tail gas is treated in the water gas shift stage.

2. Process according to claim 1 in which the hydrocarbon feedstock is subjected to a pre-reforming stage prior to passing through the steam reforming stage.

3. Process according to claim 2 in which the hydrocarbon feedstock is subjected to hydrogenation and sulfur removal prior to passing through the pre-reforming stage.

4. Process according to claim 1, in which the steam reforming stage is conducted by conventional steam methane reforming where heat for reforming is provided by radiant heat transfer, convection reforming, or combinations of both.

5. Process according to claim 1, in which the water gas shift stage is high temperature water gas shift.

6. Process according to claim 1, in which the hydrogen separation stage is conducted via a PSA-unit.

7. Process according to claim 1, in which at least a portion of synthesis gas from said separate plant for production of gasoline or diesel is also added downstream the steam methane reforming stage and upstream the water gas shift stage.

8. Process according to claim 1, wherein said tail gas comprises carbon monoxide, hydrogen, carbon dioxide and methane.

9. Process according to claim 8, wherein said tail gas includes a minimum of 5 vol. % of carbon monoxide, hydrogen, and carbon dioxide.

* * * * *